Figure 1:
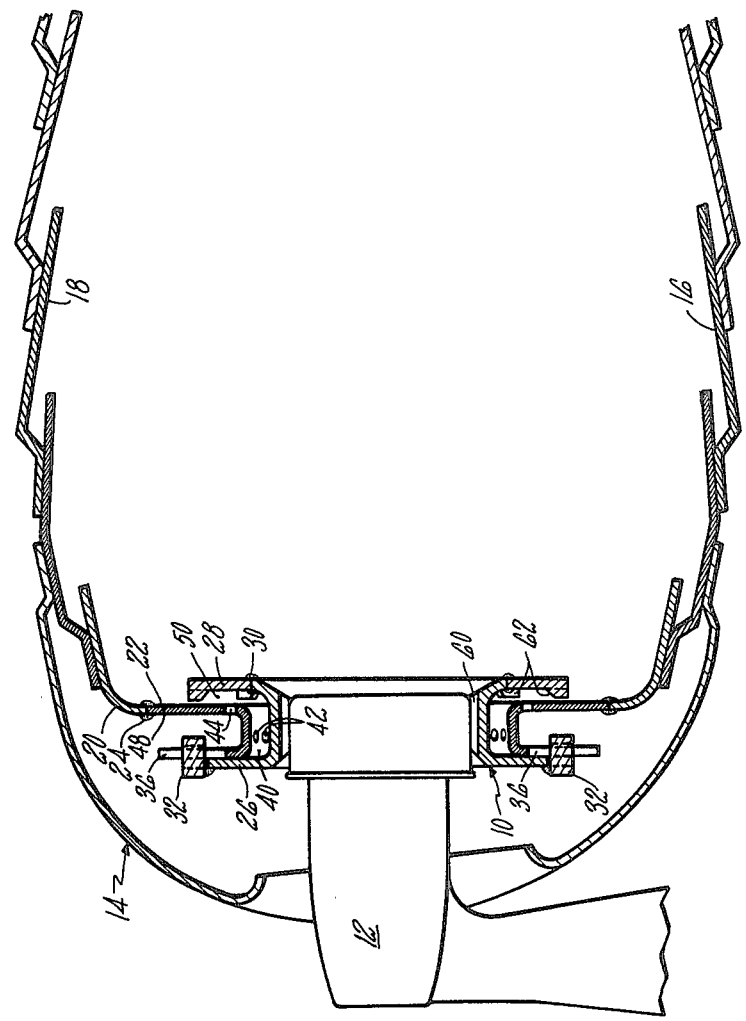
Figure 2:
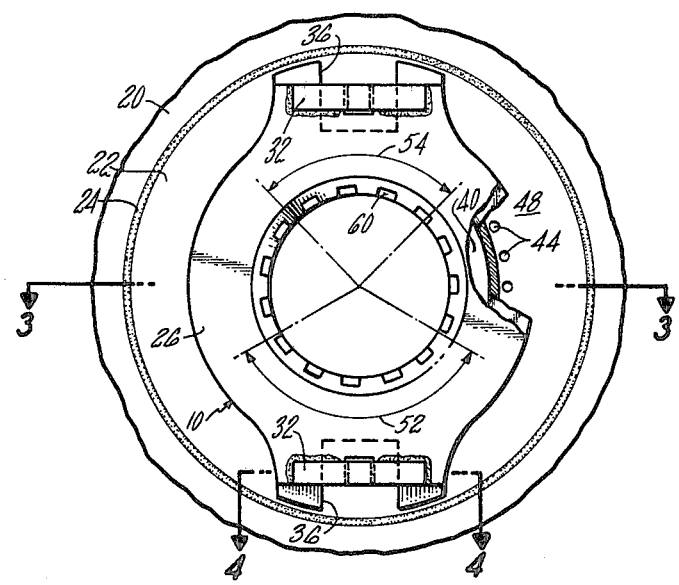
Figure 3:
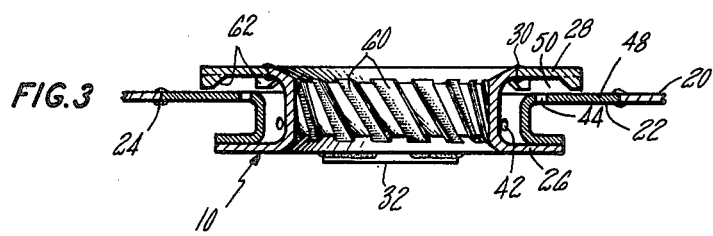
Figure 4:
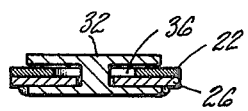

United States Patent [19]

Matthews et al.

[11] 4,365,470
[45] Dec. 28, 1982

[54] FUEL NOZZLE GUIDE AND SEAL FOR A GAS TURBINE ENGINE

[75] Inventors: John A. Matthews, Melrose; David A. Washburn, South Glastonbury; Vito J. Sarli, Manchester, all of Conn.

[73] Assignee: United Technologies Corporation, Hartford, Conn.

[21] Appl. No.: 136,655

[22] Filed: Apr. 2, 1980

[51] Int. Cl.³ .......................... F23R 3/10; F02C 7/18
[52] U.S. Cl. .................................. 60/39.32; 60/740; 60/756
[58] Field of Search ............... 60/39.32, 756, 740

[56] References Cited
U.S. PATENT DOCUMENTS 3,032,990  5/1962  Rogers ........................... 60/39.32
3,721,089  3/1973  Morrison et al. ................ 60/39.32
3,724,207  4/1973  Johnson .......................... 60/756
3,853,273  12/1974 Bahr et al. ....................... 60/756

FOREIGN PATENT DOCUMENTS 351800  3/1961  Switzerland ........................ 60/756

Primary Examiner—Robert E. Garrett
Attorney, Agent, or Firm—Norman Friedland

[57] ABSTRACT

This invention relates to the construction of the fuel nozzle guide of a turbine power plant and provides sealing while allowing relative movement between the fuel nozzle and combustion liner, and includes the judicious location of cooling passages that permit constant cooling and purging for preventing local hot spots resulting from unwanted flame holding.

3 Claims, 4 Drawing Figures

FUEL NOZZLE GUIDE AND SEAL FOR A GAS TURBINE ENGINE

CROSS REFERENCE

This invention is related to the invention disclosed in copending patent application entitled FUEL NOZZLE GUIDE HEAT SHIELD FOR A GAS TURBINE ENGINE, filed by S. C. Peterson, L. W. Stevens and I. S. Tanrikut on even date and assigned to the same assignee of this application.

TECHNICAL FIELD

This invention relates to gas turbine engines and particularly to the nozzle guide for sealing the fuel nozzle at the front end of an annular combustor.

BACKGROUND ART

As is well known in the gas turbine engine art, the durability of engine components is of paramount importance and, obviously the longer an engine component endures the longer an engine can perform without the costly shutdown of the airplane necessitated by the repair or replacement of such components. It is therefore a constant concern to develop components that can withstand the hostile environment to which they are subjected. As to be expected, one area that has been particularly troublesome is in the combustor and particularly where the fuel nozzles are attached to the combustor liner. The fuel nozzle guide and seal that supports the fuel nozzle at the front end of the annular combustor has been subjected to extraordinary thermal stresses and has heretofore been a maintenance problem. Because of these problems, noted above, the life of these components were not as long as one would like them to be.

To this end, we have found that we can obtain a longer life of the nozzle guide and seal elements than have heretofore been obtainable by fabricating the seal and heat shield integral with the fuel nozzle guide and defining an annular U-shaped element in cross section that traps the combustor liner for relative movement between the fuel nozzle and combustor. One leg of the U-shaped element serves as a heat shield, while the other serves to support the fuel nozzle guide to the liner. Cooling air holes are formed in the base of the U and so as to be routed to continuously cool the heat shield and nozzle. Tabs arranged on the inner surface of the heat shield prevent it from collapsing and blocking flow.

Discretely mounted openings between the nozzle and nozzle guide serves to eliminate any void or recess in the area adjacent the nozzle and nozzle support facing the combustion zone to prevent it from acting as a flame holder and creating localized hot spots.

DISCLOSURE OF THE INVENTION

An object of the invention is to provide an improved fuel nozzle guide and seal for an annular combustor for a gas turbine engine. Amongst the features provided by this invention are:

(1) An air seal between fuel nozzle and combustor front end that allows for the relative motion between the fuel nozzle and combustor.

(2) Constant cooling effectiveness regardless of the position of the seal device (nozzle guide) and nozzle relative to the combustor.

(3) Constant combustion aerodynamics regardless of the position of the nozzle and nozzle guide relative to the combustor.

(4) Anti-flameholding adjacent to the floating air seal by eliminating any void or recess that could act as a flameholder and result in melting and destruction of the floating air seal.

Other features and advantages will be apparent from the specification and claims and from the accompanying drawings which illustrate an embodiment of the invention.

BRIEF DESCRIPTION OF DRAWINGS

FIG. 1 is a partial view partly in elevation and partly in schematic illustrating this invention;

FIG. 2 is an end view of FIG. 1 of the essential elements of this invention;

FIG. 3 is a sectional view taken along line 3—3 of FIG. 2; and

FIG. 4 is a sectional view taken along line 4—4 of FIG. 2.

BEST MODE FOR CARRYING OUT THE INVENTION

As best shown in FIGS. 1–4, the invention comprises the combined floating fuel nozzle guide 10 and supporting structure for sealing the fuel nozzle 12 mounted at the front end of the annular combustor 14. Combustor 14 formed from an inner louvered constructed annular liner 18 and a louvered constructed outer annular liner 16 are joined together at the front end by the dome shaped combustor element 20. Dome 20 is formed with a plurality of circumferentially spaced apertures for receiving an equal number of fuel nozzles and its attendant seal and support structure. A machined bulkhead flange 22 is butt welded as shown by weldment 24 to the dome 20 at the cut out openings so as to support the fuel nozzle guide 10.

Fuel nozzle guide 10 carries an integral ring flange 26 and traps the machined bulkhead flange 22, as shown. A second ring 28 is butt welded to the fuel nozzle guide 10 along weldment 30.

The forward face of machined bulkhead flange 22 is secured against the rearward face of flange ring 26 by a pair of H-shaped clips 32. This not only serves to secure the fuel nozzle guide but also prevents uncontrolled airflow between the fuel nozzle guide flange and bulkhead flange 22.

The H-shaped clips 32, which are welded to the face of flange 26 traps the fuel nozzle guide 10 and the bulkhead flange 22. Slots 36 in the bulkhead flange 22 allow the fuel nozzle guide to float radially and circumferentially, but restrains it from axial movement.

As can be seen from FIG. 1, cooling air which is compressor discharge air is admitted into the combustor envelope through the space surrounding the fuel nozzle 12. Flange ring 28 and the fuel nozzle guide 10 define space 40 for directing flow through openings 42 and 44 formed in bulkhead flange 22. This serves to cool the hot shield provided by flange 28 by impingement cooling and direct flow radially outward to minimize the impact this flow would otherwise have on the conventional swirling nozzle airflow aerodynamics associated with the fuel nozzle. This is the case no matter what position the floating guide takes with respect to the cooling air holes 42 and 44. Furthermore, the stoichiometry in proximity to the fuel nozzle exit remains unchanged regardless of the position of the holes 42 and 44 relative to the fuel nozzle.

The holes 42 and 44 are judiciously located and discretely sized to provide the function noted hereinbelow.

Axial cooling holes 44 circumferentially spaced about the rear wall 48 of bulkhead flange 22 are sized to permit a controlled amount of cooling air to impinge on ring 28 and then turn radially outward in the space 50 to film cool the inner surface of the combustor dome 20.

Radial cooling holes 42, circumferentially spaced in the bottom wall of the U-shaped bulkhead flange 22 are sized to augment the flow issuing from cooling holes 44. Holes 42 are selectively sized to provide additional air to supplement the film cooling in a radial direction over segments defined by the arrows identified as 52 and 54. This represents that portion of the seal where the surface area to be cooled is the largest.

As is apparent from the foregoing, the floating characteristics of this assembly allows the fuel nozzle guide 10 to move radially in either direction (up or down as viewed in the drawing of FIG. 1) so that it can bottom out against the bottom of the U of the bulkhead flange 22. Hence, in the extreme case where the guide bottoms out, flow through holes 42 will be shut off. It is therefore apparent that the gap in space 50 serves to throttle the cool air issuing from holes 42. The closure due to the bottoming out coincides with a decreased surface area on the side of the combustor dome and will eliminate over cooling of this surface.

To assure that stagnation does not occur in proximity to where fuel is issued out of the fuel nozzles in the combustion zone to support unwanted flame holding, a plurality of slots 60 are provided. This prevents the unwanted flame from imparting localized heating to the metal surfaces in proximity thereto that adversely affects the longevity or thermal integrity thereof. Cooling air from the compressor in the space surrounding the fuel nozzle flows through slots 60 which are angled relative to the axial axis of the fuel nozzle guide 10. The angle is selected to impart a swirl to the cooling air as it egresses therefrom and enters the combustion zone in a manner to minimize its impact on the fuel nozzle swirling air.

A plurality of circumferentially mounted spacers 62 are secured to the wall of ring 28 to prevent the gap 50 from closing which could be occasioned by thermal distortion thereof. This will assure continuous film cooling of the combustor side of the combustor dome.

It should be understood that the invention is not limited to the particular embodiments shown and described herein, but that various changes and modifications may be made without departing from the spirit and scope of this novel concept as defined by the following claims.

We claim:

1. In combination, an annular combustor for a gas turbine engine having a cylindrical inner liner wall and a concentrically disposed outer liner wall between which combustion ensues, a dome-like element attaching the inner and outer liner at the forward end and closing off said end, a plurality of fuel nozzle guide and seal elements supported in a corresponding number of holes circumferentially disposed in said dome-like element, a generally annular shaped bulkhead U-shaped in cross section circumscribing said holes and having a flange, said fuel nozzle guide and seal element having a sleeve member extending through a central opening of said bulkhead supporting the fuel nozzle intended to supply fuel to the combustor and a forward extending flange abutting the forward face of the flange of said bulkhead, a ring element disposed parallel to, but spaced from said bulkhead mounted in situ to the end of said sleeve remote from said flange thereof, nestling said bulkhead, clip means rigidly supported to the forward face of said flange of said sleeve slidably supported to said flange of said bulkhead for radial and circumferential movement of said fuel nozzle guide and seal element, slots formed in said sleeve adjacent said fuel nozzle for conducting air from outside said combustor to circumscribe said fuel nozzle inside said combustor to prevent flameholding and means for cooling said ring element, the bottom of said U of said bulkhead being spaced from said sleeve, and said ring being spaced from said bulkhead defining a gap, openings in said bulkhead for leading cool air outside said combustor through said gap to impinge on said ring and form a film in said gap discharging into said combustor.

2. In combination as in claim 1 including circumferentially spaced tabs carried by said ring disposed adjacent said bulkhead.

3. In combination as in claim 2 wherein said clip means includes an H-shaped element having one leg of the H bonded to the face of said flange of said sleeve, the transverse section of said H being slidably mounted into a slot formed in said flange of said bulkhead and the other leg of said H extending beyond said flange of said bulkhead for limited movement of said fuel nozzle guide and seal element.

* * * * *